United States Patent [19]
Danks

[11] 4,122,918
[45] Oct. 31, 1978

[54] SAWHORSE LEGS

[76] Inventor: John Danks, Box 114, Pownal, Vt. 05261

[21] Appl. No.: 766,088

[22] Filed: Feb. 7, 1977

[51] Int. Cl.[2] .......... F16M 11/00
[52] U.S. Cl. .......... 182/181; 182/224
[58] Field of Search .......... 182/181-185, 182/224-226

[56] References Cited

U.S. PATENT DOCUMENTS 3,080,015 3/1963 Devended .......... 182/181
3,848,700 11/1974 Davis .......... 182/181

*Primary Examiner*—Reinaldo P. Machado
*Attorney, Agent, or Firm*—Robert D. Farkas

[57] ABSTRACT

A pair of sawhorse legs for forming a bench, wherein each sawhorse leg includes a frusto-pyramidal shaped bracket having a base, a pair of upwardly extending end walls, an upwardly extending front wall, and an open top, wherein the base has a plurality of holes therethrough. The upper ends of a pair of legs are affixed to the inner surfaces of the end walls, wherein each leg extends downwardly through the base to engage the ground. A clamping mechanism secures the end of a board element to the upper edges of the front and rear walls of the bracket of each sawhorse leg.

1 Claim, 3 Drawing Figures

SAWHORSE LEGS

BACKGROUND OF THE INVENTION

A number of U.S. Patents relate to variously designed sawhorses, but these devices are non-related to the sawhorse legs of my present instant invention. These U.S. Pat. Nos. are: 394,026 to Smith; 2,664,319 to Doucette; 3,167,290 to Beckwell; and 3,443,662 to Thompson.

SUMMARY OF THE INVENTION

My present invention relates to a unique and novel sawhorse legs for forming a collapsible sawhorse.

An object of my present invention is to provide a unique and novel pair of sawhorse legs for easily and readily forming a sawhorse which is readily disassembled.

A further object of my present invention is to provide a novel clamping means for securing a board element to each said sawhorse leg.

Briefly, my present invention includes a pair of sawhorse legs for forming a bench, each sawhorse leg having a frusto-pyramidal shaped bracket having a base, a pair of upwardly extending end walls, an upwardly extending front wall, and an open top, wherein the base has a plurality of holes therethrough. The upper ends of a pair of legs are affixed to the inner surfaces of the end walls, wherein each leg extends downwardly through the base and is adapted to engage the ground. A clamping mechanism is provided for securing an end of a board element across the upper edges of the front and rear walls of the housing of each sawhorse leg.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
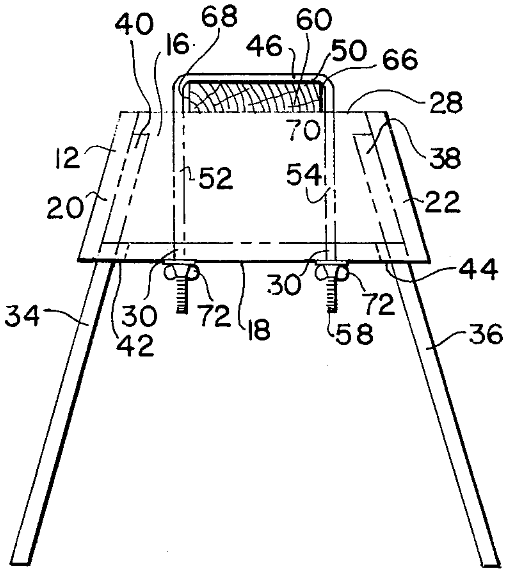
FIG. 1 illustrates an end view of one of the sawhorse legs for forming a collapsible sawhorse.
Figure 2:
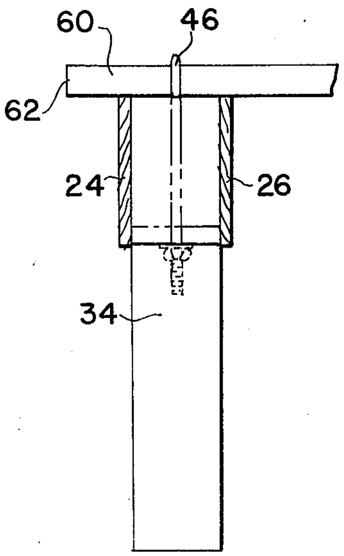
FIG. 2 illustrates a side view of one of the sawhorse legs.
Figure 3:
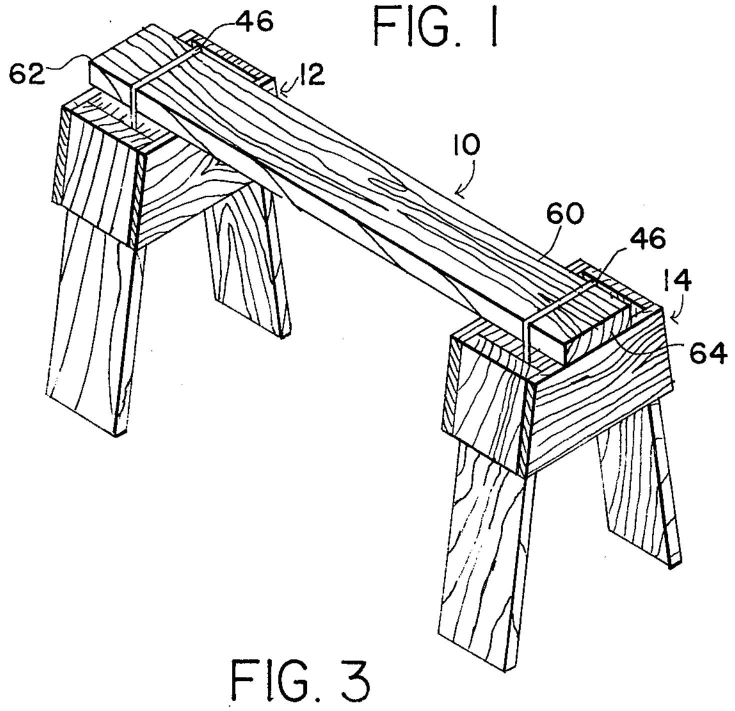
FIG. 3 illustrates a perspective view of a sawhorse using the pair of sawhorse legs.

Turning now descriptively to the drawings, in which similar reference characters denote similar elements throughout the several views, FIGS. 1 thru 3 show a pair of sawhorse legs 12, 14 for forming a collapsible sawhorse bench 10, wherein each leg 12, 14 generally comprises a frusto-pyramidal shaped bracket 16 having a base 18, a pair of upwardly extending end walls 20, 22 an upwardly extending front wall 24, an upwardly extending rear wall 26, and an open top 28, wherein the base 18 has a plurality of spaced holes 30 therethrough. The upper ends 38, 40 of a pair of leg members 34, 36 are joined to in the inner surfaces of end walls 20, 22 by appropriate anchoring means such as welding for metallic legs 34, 36 and bracket 16 or screw means for wooden or plastic legs 34, 36 and brackets 16. Each leg extends upwardly through one of a pair of slotted openings 42, 44 in the base 16, wherein one of the openings 42, 44 is disposed at each end of the base 16. A clamp member 46 is employed for each sawhorse legs 12, 14 wherein each clamp 46 includes an elongated center rod section 50, and a pair of end rod sections 52, 54 integrally affixed perpendicularly to the ends of section 50 and extends outwardly therefrom in the same direction. This is end sections 52, 54 are disposed on the same side of section 52. The outer free ends 56, 58 of each end section 52, 54 is externally threaded.

In use, the two sawhorse legs 12, 14 are placed in a vertical alignment and an elongated board member 60 is placed on top of the upper edges of the front 24 and rear 26 walls of each bracket 16 of each sawhorse leg 12, 14, wherein the ends 62, 64 of board member 60 extend outwardly from the brackets 16 of the sawhorse legs 12, 14. The clamp 46 are inserted over the board element 60 such that the center rod 50 engages the upper surface 66 of board element 60 and the free ends 56, 58 of the end sections 52, 54 insert downwardly through two of the holes 30 in base 18 as end rod sections 52, 54 engage the sides 68, 70 of the board element 60. Nut members 72 threadably engage the free ends 56, 58 of end sections 52, 54 and tighten against the lower surface of base 18. A plurality of various size clamps 46 are provided thereby being able to accommodate various widths for the board element 60.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A pair of sawhorse legs for forming a bench, wherein each said sawhorse leg comprises:

(a) a frusto-pyramidal shaped bracket having a base, a pair of upwardly extending end walls, an upwardly extending front wall, an upwardly extending rear wall, and an open top, said base having a plurality of spaced holes therethrough:

(b) the upper ends of a pair of legs affixed to the inner surface of said end walls, each said leg extending downwardly through a pair of slots in said base and being adapted to engage the ground; and (c) a clamp, said clamp having a center section and a pair of perpendicular end sections extending out in the same direction from said center section, a free end of each end section being externally threaded, said center section engaging on an upper surface of said board element, said free ends of said end sections extending through a pair of said holes in said base, and a nut threadably engaging onto each said free end below said base.

* * * * *